G. H. GIBSON.
WATER HEATING APPARATUS.
APPLICATION FILED MAR. 3, 1911.
1,179,516.
Patented Apr. 18, 1916.
4 SHEETS—SHEET 4.
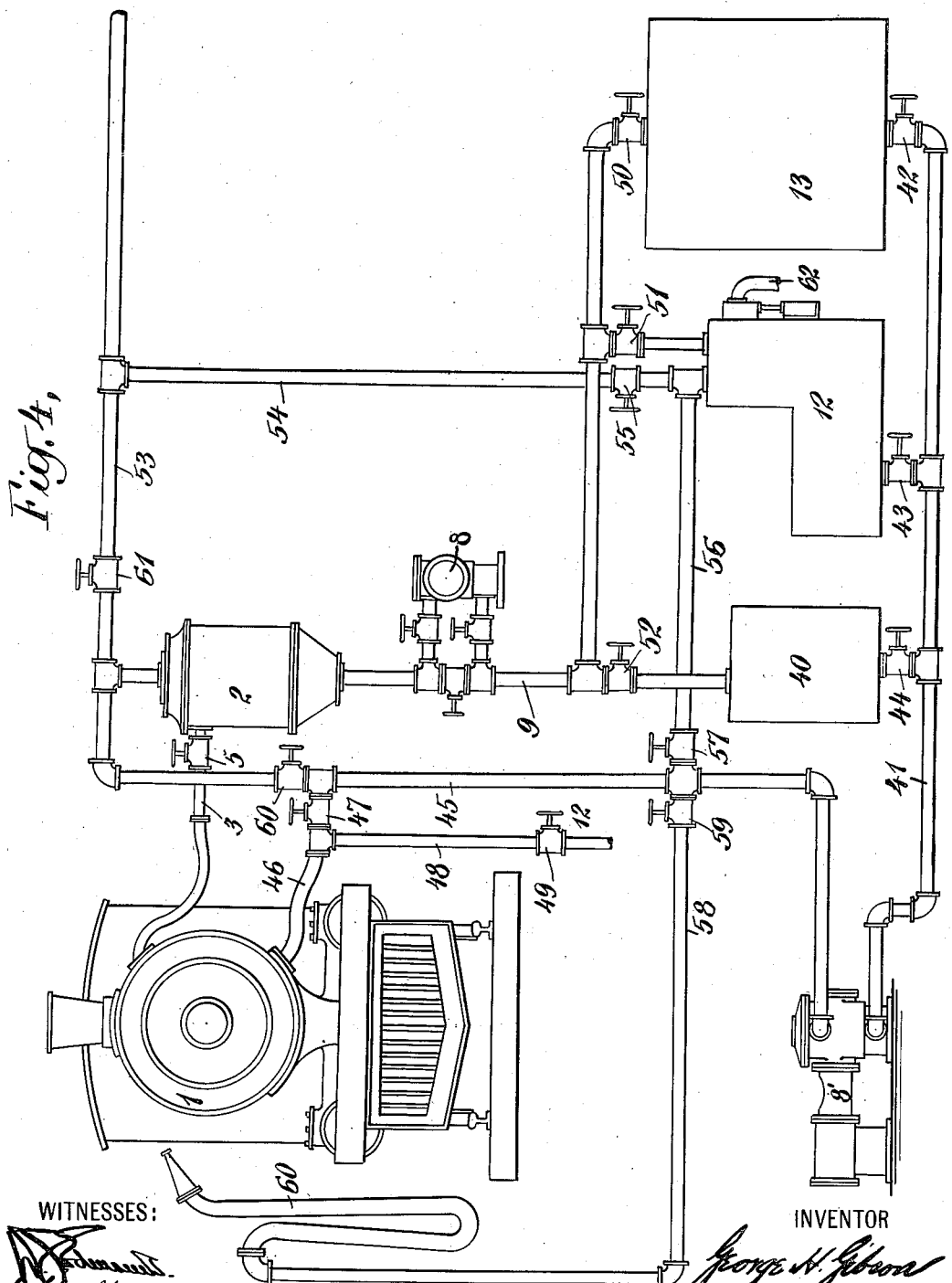
WITNESSES:
INVENTOR
George H. Gibson
BY
Edmunds & Edmunds
ATTORNEYS

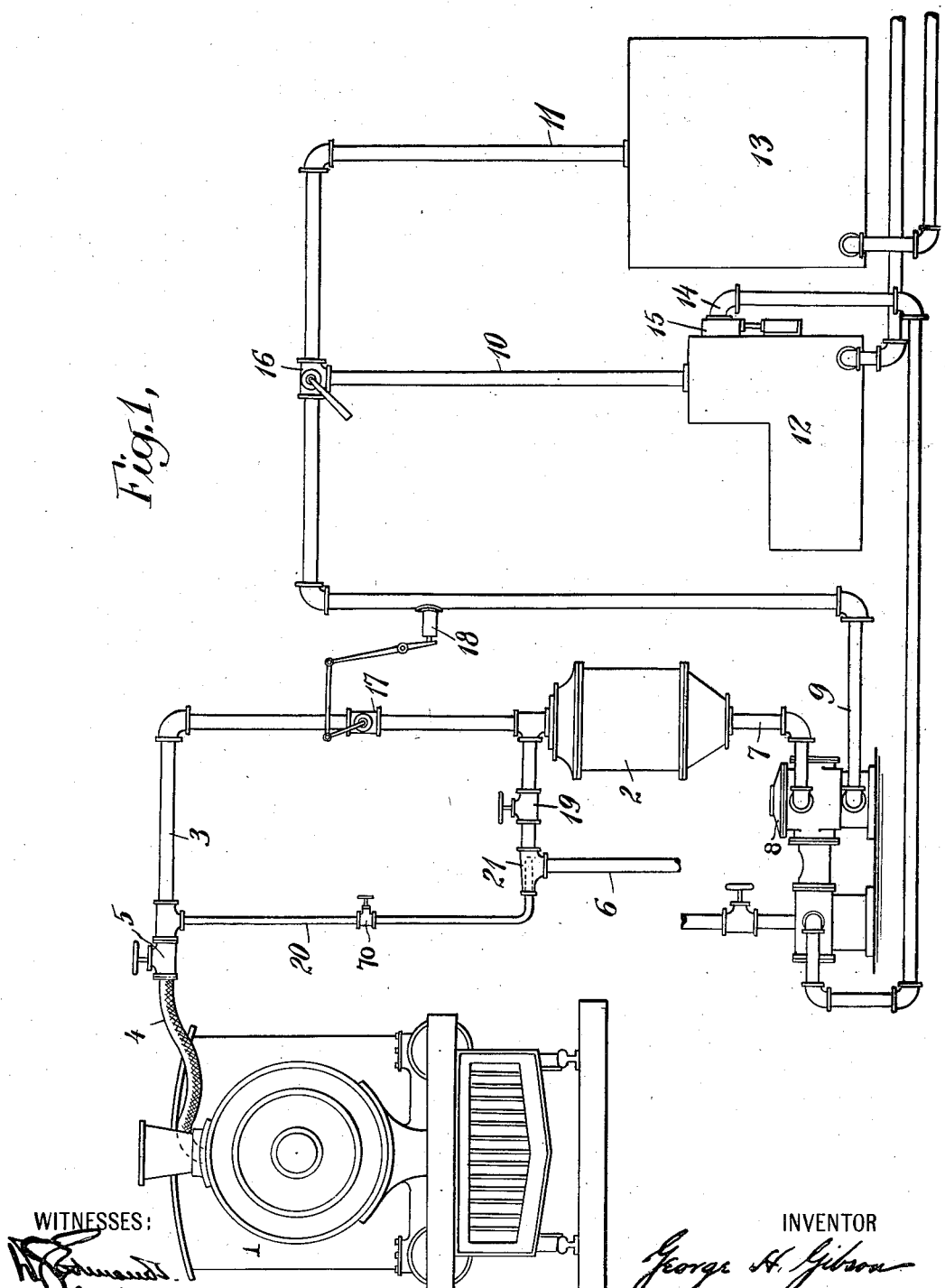

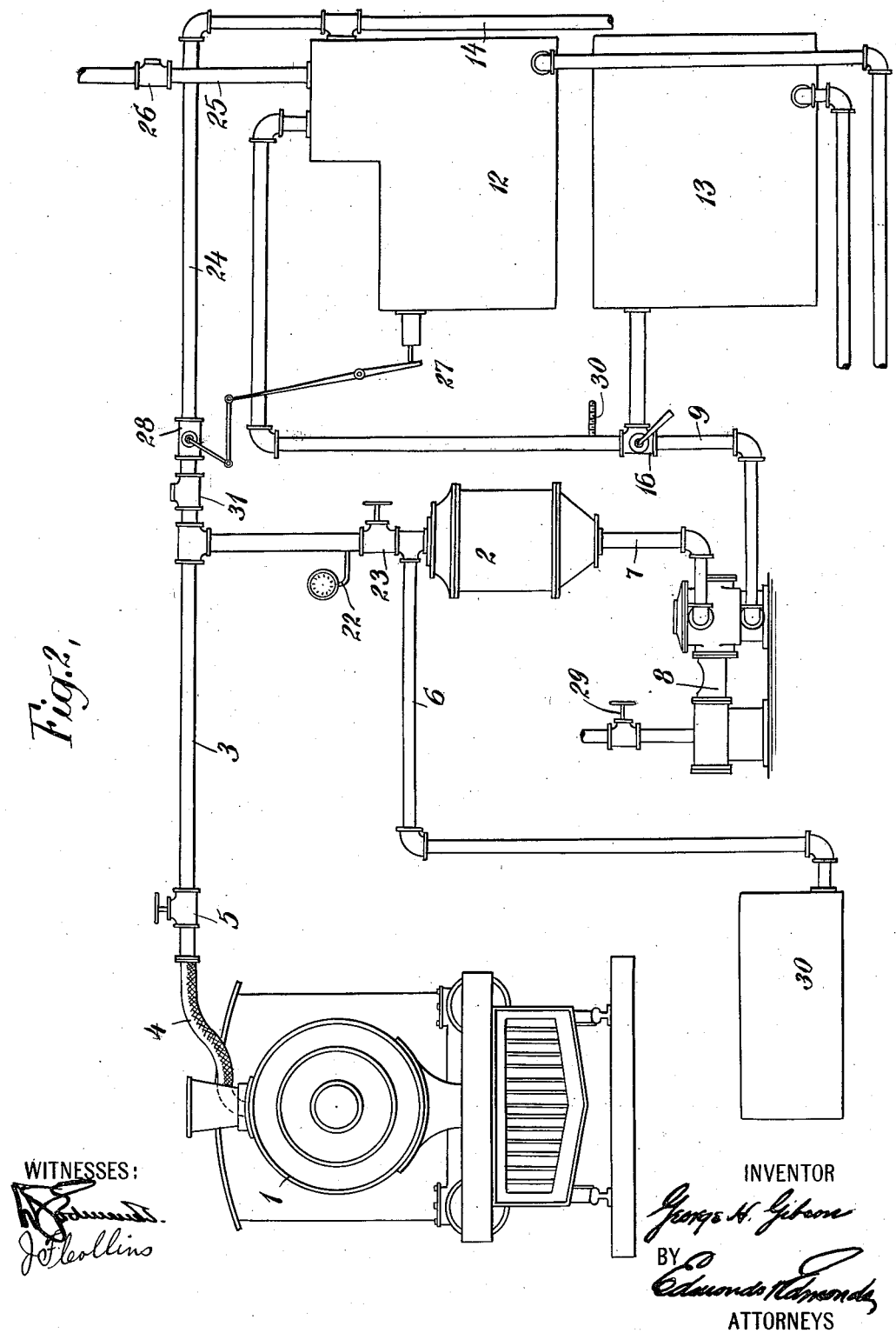

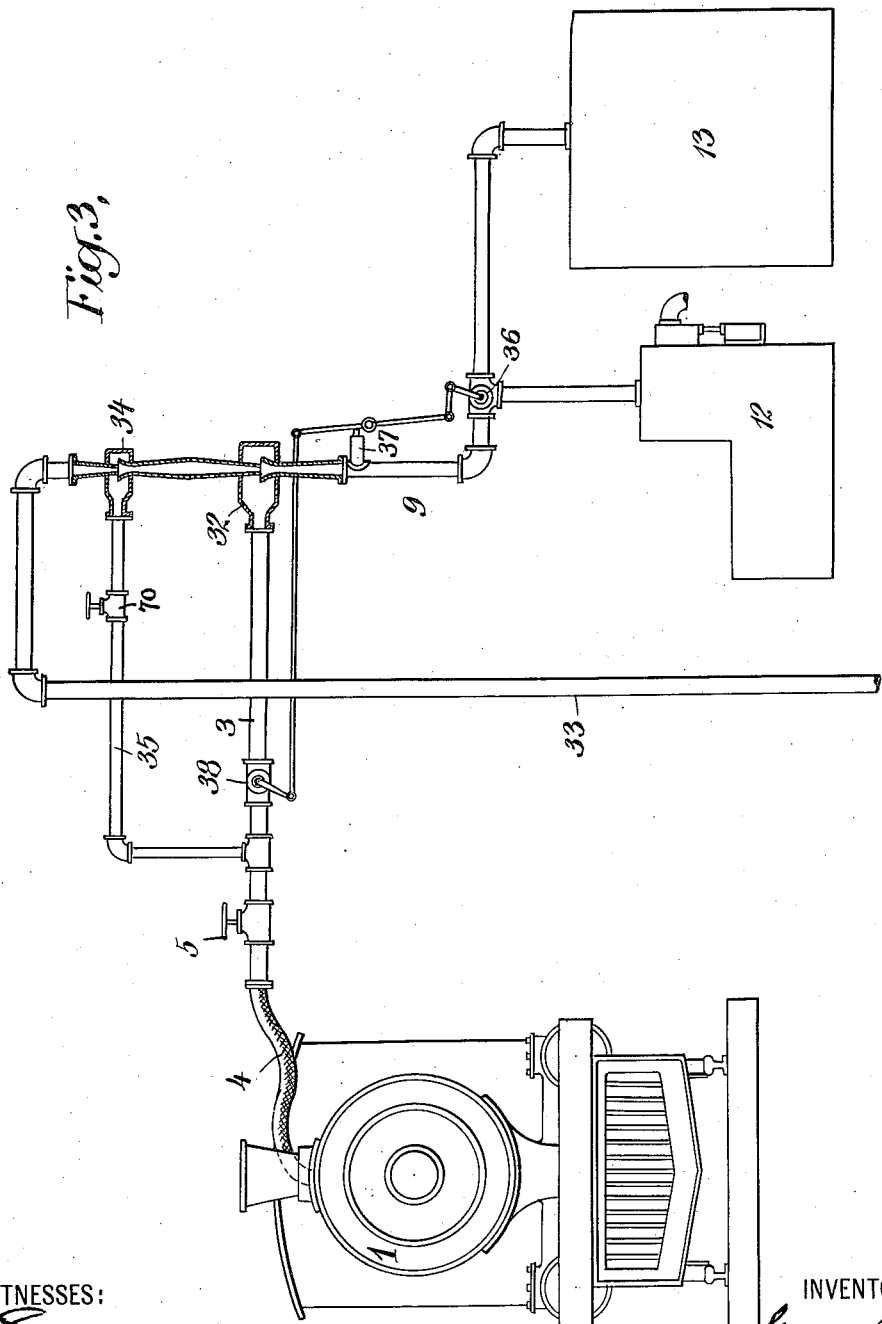

UNITED STATES PATENT OFFICE.

GEORGE H. GIBSON, OF MONTCLAIR, NEW JERSEY, ASSIGNOR TO HARRISON SAFETY BOILER WORKS, OF PHILADELPHIA, PENNSYLVANIA, A COPARTNERSHIP OF PENNSYLVANIA.

WATER-HEATING APPARATUS.

1,179,516.     Specification of Letters Patent.     Patented Apr. 18, 1916.

Application filed March 3, 1911. Serial No. 612,150.

*To all whom it may concern:*

Be it known that I, GEORGE H. GIBSON, a citizen of the United States, residing at Montclair, in the county of Essex and State of New Jersey, have invented certain new and useful Improvements in Water-Heating Apparatus, of which the following is a specification.

This invention relates to apparatus for heating water, and is directed particularly to the provision of apparatus of this character adapted for use in round-houses and similar structures for supplying water for filling and washing the boilers of locomotives. For this use, the water-heating apparatus should be reliable and efficient in operation and should be so arranged as to utilize in heating water the heat contained in the blow-off of the locomotives.

The object of this invention is to provide apparatus in which these ends are attained and which is of simple construction, so that it may be conveniently used and manufactured and installed at comparatively small expense.

In accordance with the invention, a jet-condenser is employed, in which the water to be heated comes in direct contact with steam discharged from the boiler of a locomotive which is to be emptied, washed and refilled. By reason of the employment of the jet condenser, the apparatus is very economical in operation, for the heat transferred from the blow-off to the water to be heated is that represented by a reduction of the temperature of the blow-off to a point far below 212° F., as, for instance, a temperature of 120° F. Furthermore, in the practice of the invention, apparatus may be employed which, in most cases, would be present in a round-house power-plant for other purposes, as, for instance, the utilization of the exhaust steam from various parts of the local installation for heating boiler feed-water.

I have illustrated in the accompanying drawings systems for heating water utilizing the heat from the blow-off of a locomotive, Figure 1 being a diagrammatic view of the various parts employed, and Figs. 2, 3 and 4 being modified forms of the apparatus, which may be employed if desired.

Referring first to Fig. 1, 1 indicates a locomotive whose boiler is to be emptied and either refilled or both washed and filled. 2 indicates a jet-condenser and a connection is adapted to be made from the upper portion of the boiler of the locomotive to this condenser. For this purpose, a pipe 3 is provided connected to the condenser 2, and a flexible hose 4 is provided for making connection from the end of the pipe 3 to a suitable portion of the locomotive, as, for instance, the steam-dome. In the pipe 3 is a manually-actuated valve 5. Water is supplied to the condenser 2 by a pipe 6. The pipe 7 leads from the condenser to a pump 8 which may be either a reciprocating pump or a centrifugal pump, as desired. The pump 8 forces the heated water drawn from the condenser 2 through a pipe 9, which is connected by pipes 10 and 11 to storage-reservoirs 12 and 13 respectively. The reservoir 13 is provided for the supply of water which is to be used for washing out the locomotive-boilers, which water should be maintained at a temperature of about 120°. The storage-reservoir 12 is adapted for the storage of water to be used in refilling the boiler 1, and the water stored therein should be maintained at a temperature of about 212°. In order to utilize, in heating the filling water, such exhaust-steam as may be available in the plant, the storage-reservoir 12 for the filling-water is preferably a feed-water heater of the open type, and such a device is indicated in the drawing. It is provided with a steam-inlet 14 to which connection is made from the exhaust of such engines and other steam-consuming apparatus as may be employed in the plant, including the pump 8. An oil-separator 15 is connected in the pipe 14 for removing cylinder-oil and other impurities from the steam entering the heater 12. In the pipe 9, is a valve 16, which may be operated manually or otherwise, to disconnect the pipe 11 from and connect the pipe 10 to the the pipe 9, or vice versa, to disconnect the pipe 10 from and connect the pipe 11 to the pipe 9, so that the water forced through pipe 9 by the pump 8 may be directed into either one or the other of the two storage-tanks 12 and 13.

In the pipe 3 is a throttle-valve 17, which is operated automatically to open the steam-passage through pipe 3 more or less, by a thermostat 18 projecting into the pipe 9. In the pipe 6, which carries the water to be heated to the condenser 2, is a manually-operated valve 19. At certain times, it would be necessary that the water to be heated, flowing through pipe 6, be supplied at a slight pressure; that is, a pressure sufficient to raise the water to the height of the valve 19, as will be hereinafter explained. In cases where the water to be heated is not supplied at a pressure sufficient for this purpose, a portion of the blow-off steam may be diverted from the pipe 3 and utilized in supplying the water to be heated to the condenser 2. For this purpose, a pipe 20 may be provided, leading off from the pipe 3 to an injector 21 connected in the water-supply pipe 6, a throttle-valve 70 being provided in pipe 20 to regulate the flow of steam therethrough.

It will be noted that certain of the parts above described are parts which would ordinarily be employed in a steam plant, irrespective of the utilization of the heat in the blow-off of locomotives. Thus, under ordinary conditions, that is, when no locomotives were being operated upon, the pump 8 would be forcing water from the supply-pipe 6 through the pipe 9 to the feed-water heater 12, and steam would be flowing through the pipe 14, from the various steam-consuming devices in the plant, to the heater 12, to heat the water admitted thereto through the pipe 10. When a locomotive comes in for emptying, washing and refilling, connection would be made from the boiler to the pipe 3 and the valve 5 would be opened, so that steam from the boiler would flow into the condenser 2. The water passing through the condenser 2 would be heated by the incoming steam, so that the temperature of the water flowing through pipe 9 would be raised. This water would act upon the thermostat 18, which would in turn operate the throttle-valve 17, so as to close more or less the passage for steam through the pipe 3. From this time on, the position of the movable member of the valve 17 would be regulated by the thermostat 18, so as to vary the flow of steam through pipe 3, as would be necessary to maintain a substantially uniform temperature of the water flowing through pipe 9 to the heater and reservoir 12. The operation would be continued thus until, though the thermostat 18 opened the valve 17 wide, the temperature of the water flowing through pipe 9 fell substantially below that desired for the water in the reservoir 12, due to the continued fall of the temperature of the steam passing from the locomotive-boiler as the steam is drawn off. The operator would then operate the valve 16, so as to cut off the pipe 10 and open connection from pipe 9 to pipe 11. The heated water would then flow into the reservoir 13 for the washing-water, and this operation would continue until the temperature of the blow-off had been reduced as far as is possible or desirable. By reason of the formation of a vacuum in the condenser 2, steam would be drawn off from the boiler until the temperature of the blow-off therein had been reduced to approximately 120°, or less, so that a very large proportion of the heat contained in the blow-off would be utilized. If the water to be heated were supplied to the condenser 2 at a slight pressure, the injector 21 would be unnecessary, but if the water were not at such a pressure, it would not pass to the condenser 2 and pump 8 during the first part of the blowing-off operation, when the steam from the boiler would be heating the water to 212°, at which temperature the pressure of the water vapor is equal to atmospheric pressure. In such cases, the injector 21 may be utilized, this receiving steam from the pipe 3 through the connection 20 and serving to force the water to be heated through pipe 6 and into the condenser.

The apparatus above described may be simplified in many respects by eliminating certain of the features of automatic operation. Thus, in Fig. 2, the jet-condenser, the pump, the feed-water heater and the reservoir for the washing-water, are arranged as those parts are in Fig. 1, but instead of the automatically-operated valve 17 a manually-operated valve 23 is provided in the steam pipe. Directly above this is a pressure-gage 22. With this apparatus, the pump 8 would normally be in operation, pumping water to the heater 12, and when it was desired to blow off a locomotive, connection would be made from the boiler to the pipe 3. The operator would then open the valve 5 and the rise of pressure in pipe 3 would be indicated by the gage 22. The valve 23 would then be opened so as to admit steam to the condenser 2, which steam would become mingled with the water entering through pipe 6 from any suitable source 30, and the heated water would pass through the pipe 9 to the heater 12. The operator would manipulate either the valve 23 in the steampipe 3, so as to govern the supply of blow-off steam to the condenser 2 or the throttle-valve 29 in the steam-supply of the pump, so that the heated water passing through the pipe 9 would be at a substantially uniform temperature, preferably about 212°. When the steam entering the condenser would no longer raise the water to this temperature, the operator would turn the valve 16 to the other position, so as to divert the heated water flowing through pipe 9 into the reservoir 13 for the washing-water.

As an alternative method of operation, steam may be carried from the pipe 3 directly to the heater 12, instead of passing through the condenser. For this purpose, a pipe 24 would be provided, connecting pipe 3 with the steam-inlet of the heater, and a pressure-reducing valve 28 would be provided in pipe 24 controlled by a thermostat 27 projecting into heater 12. Or the valve 28 could be a diaphragm-valve operated in response to changes of pressure within the heater, in which case a relief-valve 26 would be provided in a pipe 25 leading from the heater to atmosphere. In either case, a check-valve 31 would be provided in pipe 24 to prevent the flow of steam from the heater through pipe 24 when no locomotive was being blown off. In employing these parts, the operator, instead of opening valve 23 at the beginning of the blow-off operation, would open the throttle-valve 29 and speed up the pump, so that the water entering heater 12 would rapidly reduce the temperature of the water falling from the trays of the heater, whereupon the thermostat 27 would open the valve 28, admitting steam from the locomotive-boiler directly into the heater 12 through the pipe 24. The steam thus admitted to the heater would raise the temperature of the incoming water to that desired, and when the pressure indicated by the gage 22 fell to approximately atmospheric pressure the operator would open valve 23, thus bringing the condenser into operation. At the same time, he would move the valve 16 to the opposite position, so that the heated water would pass into the storage-reservoir 13. In operating in this manner, it would be unnecessary to make provision for raising the water from the supply point to the pump suction, as the condenser would not be brought into operation until the temperature of the blow-off had been reduced below 212°.

The apparatus above described may be considerably simplified in the manner indicated in Fig. 3. In this apparatus, a steampipe 3 is provided as before, adapted for connection to the boiler 1 through flexible pipe 4, a valve 5 being arranged to control the flow of steam in pipe 3. The steampipe 3 leads to an ejector-condenser, indicated diagrammatically at 32. The cold water supply-pipe 33 leads to an injector 34, which receives steam from the pipe 3 through a branch pipe 35 and which delivers water to the ejector-condenser 32. From the condenser 32, the heated water passes through pipe 9 to the feed-water heater and reservoir for filling-water, 12, or to the tank 13 for the washing-water. The flow of the heated water to one or the other of the two reservoirs 12 and 13 is controlled by a valve 36 operated automatically by a thermostat 37 projecting into the water-pipe 9. This thermostat may also be arranged to control a throttle-valve 38 in the steampipe 3. When a locomotive-boiler is connected to the steampipe 3 and the valve 5 is opened, steam passes through the pipe 35 to the injector 34, which draws water through the supply-pipe 33 and delivers it to the ejector-condenser 32. This water passing through the pipe 9 operates upon the thermostat 37 to open the valve 38 and allow the blow-off steam to pass through the pipe 3 to the condenser 32. From this time on, the thermostat 37 will regulate the throttle-valve 38 in such manner that the water passing from the condenser through pipe 9 will be maintained at a predetermined temperature, preferably 212°, and this water will be caused to flow into the heater 12 by the valve 36. When the temperature of the steam entering the condenser has fallen to such extent that the steam is unable to raise the water to substantially this temperature, the thermostat 37 will automatically operate the valve 36, so as to divert the water flowing through pipe 9 into the tank 13 for the washing-water. After a further drop in the temperature of the steam flowing to the condenser, such that the water is not heated to a substantial extent, the operation of the apparatus is discontinued by closing the valve 5. This may be effected automatically by the thermostat, if desired.

In some cases, it may be desirable to supply water to a locomotive-boiler for refilling, at a temperature higher than 210°. With apparatus for doing this, it may be desirable to combine apparatus for maintaining a supply of washing-water at a temperature of about 120° and a supply of water at an intermediate temperature for feeding to the boilers employed in connection with the local plant. Such a system is illustrated in Fig. 4, in which 2 indicates a jet-condenser as before, connected by a pipe 3 to the locomotive-boiler 1, a valve 5 being provided in pipe 3. A pump 8' supplies the water to be heated to the condenser 2, and the heated water flowing therefrom may be led to a feed-water heater 12 or to a tank 13 or to a tank 40. The tank 13 is a reservoir for washing-water as before, and the feed-water heater and reservoir 12 is adapted to contain water at a temperature of 210°, to be fed to the boilers of the local plant. The tank 40 is provided for water at a temperature in excess of 210°, as, for instance, 288°, which water is to be supplied to the boilers of locomotives in refilling them. The pump 8' may draw water from any one of the three tanks, through pipe 41, this being connected to tanks 13, 12 and 40 through valves 42, 43 and 44 respectively. The pipe 45 leading from the pump to the condenser may be connected by a pipe 46 with the boiler 1 through a valve 47, and the pipe 46 is connected to a pipe 48 leading to waste, this pipe being provided with valve 49. The pipe 9 leading from the condenser is connected to the three tanks 13, 12 and 40 through valves 50, 51 and 52, respectively. The cold water supply-pipe 53 is connected by a pipe 54 with the feed-water heater 12 through a valve 55, and below this valve pipe 54 is connected by a pipe 56 to the pipe 45 through a valve 57. From the pipe 45, a pipe 58 leads through a valve 59 to a wash-out connection 60. Supposing that a locomotive comes in to be emptied, washed and refilled under a gage-pressure of 150 pounds, which corresponds to a temperature of 366° F., connection will be made from the boiler through pipe 3 to the condenser 2. Valve 5 in the steampipe 3 and valve 60 in the water-pipe 45 would then be opened, and the pump 8' started. Also, valves 43 and 52 would be opened, but valves 42, 44, 51 and 50 would remain closed. The operation of the pump 8' would then draw water at 210° from the reservoir or heater 12 through valve 43 and pipe 41, and force it through pipe 45 to the condenser 2, from which it would flow through pipe 9 and valve 52 to the tank 40. This water at 210° would be heated by the high-temperature steam in the condenser 2 to the temperature desired for the filling-water to be stored in the tank 40. Operation in this manner would continue until the water in the locomotive-boiler had been reduced in temperature to approximately 288°. The operator would then close valves 43 and 52 and open valves 42 and 51, whereupon water would be drawn from the supply of washing-water in tank 13 at a temperature of 120°, and carried to the condenser 2, where it would be heated by the steam entering the condenser and would then flow through the pipe 9 and valve 51 to the feed-water heater 12. In this way, water would be transferred from the tank 13 to the reservoir 12, to an extent substantially equal to that which was transferred from reservoir 12 to tank 40, and the water so transferred would be raised in temperature from 120° to 210°. The valves 42 and 51 would then be closed and valve 50 opened. Also, the operator would open a valve 61 in the cold-water supply-pipe 53. Cold water would then flow through pipe 53 to the condenser 2 and from it through the pipe 9 and valve 50 to the tank 13 for the washing-water, and this water would be heated by the steam entering the condenser through the pipe 3 to the temperature desired for the washing-water. In this way the supply of washing-water in the tank 13, which had been reduced to supply the tank 12, would be restored to its original amount.

At any time when it might become necessary, cold water could be admitted to the condenser through pipe 53 and carried to tank 12 or tank 40, the temperature of this water being raised to the desired amount in the condenser 2. Also, if desired, water could be drawn from the tank 13 and admitted to the tank 12 without passing through the condenser 2, this water, instead, passing through the pipe 56 after valve 57 had been opened and valve 60 closed. In this way the supply of water in the reservoir 12 could be replenished after it had been drawn on to supply the boilers of the local plant, and water so admitted would be raised in temperature from 120° to 210° by the exhaust-steam admitted to the heater 12 through pipe 62. After the temperature of the water in the locomotive-boiler had been reduced in this way, this water would be allowed to run to waste through pipe 48, by closing valve 47 and opening valve 49. Valves 42 and 59 would then be opened and washing-water pumped from the tank 13 through pipes 41 and 58 to the wash-out connection 60. At the completion of the washing operation, valves 42 and 59 would be closed and valves 44 and 47 opened, whereupon the operation of the pump would draw filling-water from tank 40 through pipe 41 and force it through pipes 45 and 46 into the boiler. If the tank 40 were at a level above the locomotive-boiler, it would be unnecessary to pass this filling-water through the pump 8', but instead suitable connection might be made whereby the water would flow by gravity from tank 40 to the locomotive-boiler.

If it were desired to change the water in the boiler of a locomotive without washing out the boiler, connections would be made in the manner above described, whereby the steam in the boiler would be utilized for heating to 288° such water as would be required to replenish the supply of filling-water in tank 40, whereupon the valve 5 would be closed and the valve 49 opened, so that water remaining in the boiler would run to waste. Valve 49 would be closed, however, immediately after the the water had run out, in order to prevent the escape of the steam remaining in the boiler and the consequent cooling of the boiler. Valves 44 and 47 would then be opened, so that the pump 8' could force the filling-water into the boiler.

Having described my invention, what I claim as new therein and desire to secure by Letters Patent of the United States is:

1. Apparatus for discharging locomotive boilers and supplying water thereto comprising a pipe adapted to be connected to the locomotive boiler, a jet condenser connected to said pipe and receiving steam from the boiler therethrough, a water-supply pipe connected to the condenser and carrying water to be heated thereto, means for employing steam from said boiler for forcing the water to be heated to the condenser under pressure, means for regulating the relative flow of steam and water to the condenser to control the temperature of the water flowing from the condenser, a pump for pumping the heated water from the condenser, a plurality of receptacles connected to the pump, and means for diverting the heated water into one or another of said receptacles, substantially as set forth.

2. Apparatus for discharging locomotive boilers and supplying water thereto comprising a pipe adapted to be connected to the locomotive boiler, a jet condenser connected to said pipe and receiving steam from the boiler therethrough, a water-supply pipe connected to the condenser and carrying water to be heated thereto, means for employing steam from said boiler for forcing the water to be heated to the condenser under pressure, means for regulating the relative flow of steam and water to the condenser to control the temperature of the water flowing from the condenser, a pump for pumping the heated water from the condenser, a tank and a feed-water heater connected to the pump, and a manually-operated valve for diverting the heated water into said tank or said heater, substantially as set forth.

3. Apparatus for discharging locomotive boilers and supplying water thereto comprising a pipe adapted to be connected to the locomotive boiler, a jet condenser connected to said pipe and receiving steam from the boiler therethrough, a water supply pipe connected to the condenser, a receptacle connected to the condenser and receiving heated water therefrom, a feed-water heater, and means for carrying steam direct from said pipe to said heater, substantially as set forth.

4. Apparatus for discharging locomotive boilers and supplying water thereto comprising a pipe adapted to be connected to the locomotive boiler, a jet condenser connected to said pipe and receiving steam from the boiler therethrough, a water-supply pipe connected to the condenser and carrying water to be heated thereto, a pump for pumping the heated water from the condenser, a tank and a feed-water heater connected to the pump, a pipe connected to said pipe and to said heater for carrying steam direct to the heater and an automatically-operated valve in said pipe, substantially as set forth.

5. Apparatus for discharging locomotive boilers and supplying water thereto comprising a pipe adapted to be connected to the locomotive boiler, a condenser connected to said pipe and receiving steam from the boiler therethrough, a water-supply pipe for carrying the water to be heated in the condenser, means for utilizing steam from the locomotive boiler in supplying the water to the condenser, means for regulating the relative flow of steam and water to the condenser to control the temperature of the water flowing from the condenser, and a receptacle for the heated water connected to the condenser, substantially as set forth.

6. Apparatus for discharging locomotive boilers and supplying water thereto comprising a pipe adapted to be connected to the locomotive boiler, a condenser connected to said pipe and receiving steam from the boiler therethrough, a water-supply pipe for carrying the water to be heated in the condenser, means for utilizing steam from the locomotive boiler in supplying the water to the condenser, a tank and a feed-water heater connected to the condenser and a valve for controlling the flow of heated water from the condenser into said tank or said heater, substantially as set forth.

7. Apparatus for discharging locomotive boilers and supplying water thereto comprising a pipe adapted to be connected to the locomotive boiler, a condenser connected to said pipe and receiving steam from the boiler therethrough, a water-supply pipe for carrying the water to be heated in the condenser, an injector for supplying water to condenser, from the water-supply pipe to the condenser, means for regulating the relative flow of steam and water to the condenser to control the temperature of the water flowing from the condenser, means for carrying steam from the locomotive boiler to the injector, and a receptacle for the heated water flowing from the condenser, substantially as set forth.

8. Apparatus for discharging locomotive boilers and supplying water thereto comprising a steam pipe adapted to be connected to the boiler of a locomotive, an ejector condenser connected to said pipe, a water-supply pipe, an injector connected to said pipes, receiving water and steam therefrom and supplying water to the ejector condenser, and a receptacle receiving the heated water from the condenser, substantially as set forth.

9. Apparatus for discharging locomotive boilers and supplying water thereto comprising a steam pipe adapted to be connected to the boiler of a locomotive, an ejector condenser connected to said pipe, a water-supply pipe, an injector connected to said pipes, receiving water and steam therefrom and supplying water to the ejector condenser, two receptacles for receiving the heated water from the condenser, and an automatically operated valve for controlling the flow of the heated water into said receptacles, substantially as set forth.

10. Apparatus for discharging locomotive boilers and supplying water thereto comprising a pipe adapted to be connected to the locomotive boiler, a jet condenser connected to said pipe and receiving steam from the boiler therethrough, a water-supply pipe connected to the condenser and carrying water to be heated thereto, a plurality of receptacles connected to the condenser and receiving heated water therefrom, means for diverting the heated water into any one of said receptacles, and means for transferring water from one of said receptacles to another, substantially as set forth.

11. Apparatus for discharging locomotive boilers and supplying water thereto comprising a pipe adapted to be connected to the locomotive boiler, a jet condenser connected to said pipe and receiving steam from the boiler therethrough, a water-supply pipe connected to the condenser and carrying water to be heated thereto, a plurality of receptacles connected to the condenser and receiving heated water therefrom, means for diverting the heated water into any one of said receptacles, and means for transferring water from one of said receptacles to another through said condenser, substantially as set forth.

12. Apparatus for discharging locomotive boilers and supplying water thereto comprising a pipe adapted to be connected to the locomotive boiler, a jet condenser connected to said pipe and receiving steam from the boiler therethrough, a water-supply pipe connected to the condenser and carrying water to be heated thereto, a plurality of receptacles connected to the condenser and receiving heated water therefrom, means for diverting the heated water into any one of said receptacles, a pump, means for operating said pump to transfer water from one of said receptacles to another, and means for operating said pump to supply water from one of said receptacles to the locomotive boiler, substantially as set forth.

This specification signed and witnessed this 21st day of February, 1911.

GEORGE H. GIBSON.

Witnesses:
 ROBERT G. CLIFTON,
 JESSE E. HARRIS.